US011069937B2

(12) United States Patent
Mueller et al.

(10) Patent No.: US 11,069,937 B2
(45) Date of Patent: Jul. 20, 2021

(54) ENCLOSING ELEMENT, ENCLOSING MODULE, STORAGE MODULE AND ARRANGEMENT FOR PROVIDING ELECTRICAL ENERGY AND A TRANSPORT VEHICLE CONTAINING THE STORAGE MODULE OR THE ARRANGEMENT FOR PROVIDING ELECTRICAL ENERGY

(71) Applicant: Colibri Energy GmbH, Frankfurt (DE)

(72) Inventors: Lorenz Mueller, Berlin (DE); Patrick Heine, Berlin (DE)

(73) Assignee: Colibri Energy GmbH, Frankfurt (DE)

( * ) Notice: Subject to any disclaimer, the term of this patent is extended or adjusted under 35 U.S.C. 154(b) by 251 days.

(21) Appl. No.: 16/047,973

(22) Filed: Jul. 27, 2018

(65) Prior Publication Data

US 2019/0036093 A1    Jan. 31, 2019

(30) Foreign Application Priority Data

Jul. 27, 2017   (DE) ..................... 10 2017 117 067.7

(51) Int. Cl.
| | | |
|---|---|---|
| *H01M 50/20* | (2021.01) | |
| *H01M 10/42* | (2006.01) | |
| *H02J 7/00* | (2006.01) | |
| *H01M 50/24* | (2021.01) | |
| *H01M 50/502* | (2021.01) | |
| *H01M 50/581* | (2021.01) | |
| *H01M 10/613* | (2014.01) | |

(52) U.S. Cl.
CPC ......... *H01M 50/20* (2021.01); *H01M 10/425* (2013.01); *H01M 50/24* (2021.01);
(Continued)

(58) Field of Classification Search
CPC ... B60L 50/64; H01M 10/425; H01M 10/613; H01M 2010/4271; H01M 2010/4278;
(Continued)

(56) References Cited

U.S. PATENT DOCUMENTS

| | | |
|---|---|---|
| 7,678,493 B2 | 3/2010 | Morita et al. |
| 9,296,310 B2 | 3/2016 | Garfinkel et al. |

(Continued)

FOREIGN PATENT DOCUMENTS

| | | |
|---|---|---|
| DE | 10 2004 037 836 A1 | 4/2005 |
| DE | 10 2010 050 998 A1 | 5/2012 |

(Continued)

*Primary Examiner* — Adam A Arciero
(74) *Attorney, Agent, or Firm* — Seed Intellectual Property Law Group LLP (57) ABSTRACT

The present disclosure provides an enclosing element for enclosing and electrically contacting a stacked arrangement of a plurality of electrical storage cells; an enclosing module comprising a first and a second enclosing element which is spatially separated from said first enclosing element; and a storage module comprising a stacked arrangement of a plurality of electrical storage cells. The present disclosure also provides a load disconnector as well as an arrangement for supplying electrical energy comprising the storage module and the load disconnector. The present disclosure further provides a trough for holding storage modules, and a transport vehicle containing said storage module, said arrangement for supplying electrical energy, said load disconnector or said trough.

25 Claims, 6 Drawing Sheets

(52) U.S. Cl.
CPC ....... *H01M 50/502* (2021.01); *H01M 50/581* (2021.01); *H02J 7/00* (2013.01); *H01M 10/613* (2015.04); *H01M 2010/4271* (2013.01); *H01M 2010/4278* (2013.01)

(58) Field of Classification Search
CPC .. H01M 2/1077; H01M 2/1094; H01M 2/206; H01M 2/348; H02J 7/00; H02J 7/0013
See application file for complete search history.

(56) References Cited

U.S. PATENT DOCUMENTS

| | | |
|---|---|---|
| 9,368,845 B2 | 6/2016 | Jairazbhoy et al. |
| 9,543,686 B2 | 1/2017 | Schuelke et al. |
| 2009/0146610 A1 | 6/2009 | Trigiani |
| 2010/0163326 A1 | 7/2010 | Takamura et al. |
| 2013/0149575 A1* | 6/2013 | Gebbie ............... H01M 10/617 429/72 |
| 2014/0023909 A1* | 1/2014 | Suzuki ................ H01M 2/1077 429/158 |
| 2017/0214103 A1* | 7/2017 | Onnerud ................ H01G 11/06 |

FOREIGN PATENT DOCUMENTS

| | | |
|---|---|---|
| DE | 10 2011 078 235 A1 | 1/2013 |
| DE | 20 2014 102 895 U1 | 9/2014 |
| DE | 10 2015 203 146 A1 | 8/2015 |
| DE | 10 2015 103 955 A1 | 9/2015 |
| WO | 2016/067487 A1 | 5/2016 |

\* cited by examiner

ENCLOSING ELEMENT, ENCLOSING MODULE, STORAGE MODULE AND ARRANGEMENT FOR PROVIDING ELECTRICAL ENERGY AND A TRANSPORT VEHICLE CONTAINING THE STORAGE MODULE OR THE ARRANGEMENT FOR PROVIDING ELECTRICAL ENERGY

BACKGROUND

Technical Field

The present disclosure provides an enclosing element, an enclosing module, a storage module, a load disconnector, an arrangement for providing electrical energy and a tank, as well as transport vehicles containing the storage module, the arrangement for providing electrical energy, the load disconnector or the tank and the use of the storage module, the arrangement for providing electrical energy, the load disconnector or tank for the supply of transport vehicles with electrical energy or as a stationary energy source.

Description of the Related Art

Storage devices for storing electrical energy are becoming increasingly important. Here, the storage devices must meet a wide range of different standards. In the field of electromobility, high capacities with the lowest possible weight are required. At the same time, the power output must be sufficient to drive the electric engines. The storage device must also not take too long to charge. Traction batteries for unsprung vehicles such as forklift trucks or airport service vehicles must also be extremely robust against shocks. Stationary storage devices play an important role when storing the electrical energy generated from renewable energy sources. These storage devices must have a rather long service life. Additionally, they must be suitable for being charged with different, fluctuating charge flows.

Storage devices for storing electrical energy must also resist a wide range of different external influences. In some regions, temperatures above 40° C. are not uncommon. The same also applies to temperatures below −40° C. Air traffic is frequently exposed to such temperatures at cruising altitude. High or constantly changing air humidity or temperatures can afflict storage devices to the same degree as fine desert dust in arid regions.

A wide range of different storage devices is currently regularly used in a large number of different areas. Usually, chemical storage devices are used. These storage devices, which are also known as secondary elements, store the electrical energy in the form of chemical energy. A differentiation is made between the various types of secondary elements, depending on the materials used. Lead-based systems currently continue to be widely used as starter batteries for motor vehicles. Due to their low price, these rechargeable batteries are also used as an emergency power supply or as storage facilities for photovoltaic systems. Due to the relatively low energy density, lead rechargeable batteries are usually larger and heavier than other systems. They are therefore being increasingly replaced by lithium ion-based systems, for example in the area of mobile end appliances as well as in the field of electromobility. Lithium ion-based systems have a significantly lower weight due to their high energy density. Li-ion rechargeable batteries react sensitively to overcharging and deep discharging. They are therefore regularly operated with so-called battery management systems (BMS). In standard Li-ion rechargeable batteries, the relevant electronic system is already integrated.

Li secondary elements are generally more expensive than lead-based systems. However, due to the higher energy density, the higher efficiency and in most cases the longer service life, this added cost is frequently considered worth paying.

Since 2004, it has been prohibited to sell NiCd rechargeable batteries on the market in the EU, with just a few exceptions. This technology is therefore increasingly becoming less important.

The voltage of individual secondary cells is usually specified by the underlying chemistry. Depending on the material used, the voltage usually lies between 2V and 4V. Other voltage levels can also be achieved through electronic circuitry. The construction and size of the secondary cells are of decisive importance for their capacity. Lithium-ion secondary cells usually have nominal voltages in the range of 3V to 4V.

The storage devices are regularly designed as batteries, in other words as a structural combination of a plurality of secondary cells. For this purpose, several so-called pouch cells are frequently compiled and connected in a housing. If a storage device contains several such batteries in a modular structure, the batteries are also known as battery modules.

Pouch cells are known to persons skilled in the art. They are pouch-shaped secondary cells. These commonly have an essentially cuboid shape, with a height, breadth and depth, whereby the breadth is commonly greater than the depth, which is commonly greater than the height of the pouch cell. Usually, the electric poles are arranged as tongue-shaped electrodes, also known as the first and second contact element, on one of the two smallest sides in terms of area (height×depth) of the cuboid. This side is referred to below as the front side or contacting side of the pouch cell. The side opposite to it is therefore referred to as the rear side. The two largest sides in terms of area (depth×breadth) are known as the upper side and lower side.

The operating voltage of storage devices is usually considerably higher than the voltage present on the secondary cells. The secondary cells of a battery or battery module are therefore usually connected in series, so that the voltage of the battery module corresponds to the total of the individual voltages of the secondary cells.

During charging and discharging of storage cells, and therefore also of batteries or battery modules, heat is generated. Of key importance in this respect is the electrical internal resistance of the storage cells and the modules. The heat released is here in particular dependent on the charging or discharging capacity. With high-capacity storage devices, the heat generated must be dissipated in order to avoid overheating and the damage that this causes. This dissipation of heat is of central importance in the development of high-capacity storage devices.

US 2010/0163326 A1 describes a battery temperature regulation system. The battery is stored in a battery housing in this case. This housing has air inlets and outlets equipped with fans and valves for controlling an air flow in order to cool the battery or parts of the battery.

There are also attachments for cooling the individual modules. According to DE 10 2015 203 146 A1, the secondary cells are arranged on a thermal conducting plate with a multi-flow canal configuration for a flowing thermofluid.

A similar concept is pursued in DE 10 2015 103 955 A1. Here, so-called thermoplates are used which can have channels for circulating a fluid medium. At the same time, these thermoplates form parts of the outer walls of the battery modules. From the thermoplates, cooling fins protrude into the interior of the battery module, so that they are respectively arranged there between two adjacent secondary cells and can deflect the heat of the secondary cells onto the thermoplates.

US 2013/0149575 also concerns the discharge of heat using fluid channels.

Alternatively, DE 20 2014 102 895 U1 suggests an open battery tank on both sides in order to enable the air circulation between the battery modules.

The disadvantage of these solutions is that they require active cooling. As a result, the amount of maintenance required increases, e.g. due to the regular inspection and replacement of the coolants. Active cooling also comprises movable parts which are subject to wear and which must also be regularly maintained. Additionally, the cooling devices with unsprung vehicles such as forklift trucks must withstand considerable shocks. Open cooling systems with air as a cooling medium are by contrast constantly exposed to the external environmental conditions. In arid areas, fine desert dust can block up air filters, for example, and have a negative impact on the electronics, thus reducing the readiness for use of the battery and considerably increasing the amount of maintenance required.

Conventional battery systems for cars are only suitable for use in unsprung vehicles to a limited degree. Due to the lack of springs, the batteries are exposed to considerably stronger impact and shocks. This circumstance requires measures in order to secure the storage device as a whole, as well as its individual components, against the high accelerations. The tongue-shaped electrodes in the pouch cells are frequently weak points. These are usually made of a thin sheet metal, and can tear off if the cells are exposed to shocks that are too strong. A simple approach would be to enclose the cells sufficiently tightly and firmly so that no movement is possible if a shock occurs. However, it must be taken into account that the pouch cells can expand during charging and discharging. In order to avoid the creation of high pressures or even explosions, the cells must therefore be given sufficient room to expand. Additionally, a dense arrangement of the cells would make the discharge of heat more difficult.

The aim of the development of storage devices for storing electrical energy is therefore to overcome the disadvantages of the prior art and to develop a high-capacity, durable and low-maintenance energy storage device which can also withstand external mechanical influences such as impact and vibrations, and external environmental influences such as temperature, air humidity and dust.

BRIEF SUMMARY

The present disclosure provides a storage device and also by the components contained therein, which make their contribution to the attainment of the object.

Accordingly, the present disclosure provides a first embodiment version by an enclosing element, which is arranged and designed for enclosing and electrically contacting an arrangement, in some cases an essentially cuboid, stacked arrangement of a plurality of electrical storage cells, comprising at least one first essentially flat partial area, arranged and designed for being brought into contact on a first side surface of the arrangement of electrical storage cells, at least one second essentially flat partial area, arranged and designed to be brought into contact on a second side surface of the arrangement of electrical storage cells, and at least one third essentially flat partial area, arranged and designed to be attachable, fittingly or at a distance, from the arrangement of electrical storage cells, when the first partial area and the second partial area are in contact with the first or second side surface of the arrangement of electrical storage cells, and optionally at least one fourth essentially flat partial area, arranged and designed to be attachable opposite the third partial area, fittingly or at a distance, from the arrangement of electrical storage cells, wherein the first, second, third and optionally fourth partial areas are connected to each other, in some cases are designed as a single piece.

BRIEF DESCRIPTION OF THE SEVERAL VIEWS OF THE DRAWINGS

Further features and advantages of the present disclosure are contained in the description below, in which some embodiments of the present disclosure are explained as an example with reference to schematic drawings, in which.

DETAILED DESCRIPTION

A plurality of electrical storage cells is usually necessary for sufficient capacity of a storage arrangement. These electrical storage cells are generally arranged in such a manner that the upper and lower sides are in contact with each other and several cells thus form a stacked arrangement of electrical storage cells. In a similar manner to the individual electrical storage cells, the stacked arrangement has a contacting side or front side, a rear side opposite it and upper and lower sides extending between the contacting side and the rear side.

Many electric vehicles such as forklift trucks or baggage carriers are designed to hold traction batteries, the battery poles of which are arranged on the upper side of the battery. Accordingly, the storage cell is usually arranged standing on its rear side, i.e., with its frequently tongue-shaped electrodes pointing upwards. Surprisingly, it has emerged that an arrangement of electronic storage cells is considerably more resistant against mechanical impact when the cells are arranged on top of each other on their upper or lower side. In this arrangement, the force that occurs as a result of the shock, e.g., when driving over a joint or threshold, does not act along the tongue-shaped electrodes, but vertical to them. The risk of the tongues tearing off is reduced. In this arrangement, the tongue-shaped electrodes point horizontally away from the arrangement. For the use as a battery or battery module, it is advantageous to arrange the electrical connections of the storage arrangement on the upper side. An obvious solution would be to guide the current via wires or cables from the front side of the lying electrical storage cells to the required position. This is the simplest and, in terms of material required, the lowest-cost solution. However, it has emerged that this circuitry leads to too high electrical resistances, and a great quantity of heat is created. Surprisingly, it has emerged that these disadvantages can be overcome with the enclosing element of the present disclosure. The enclosing element can be arranged in such a manner that the second flat partial area is in electrically conducting contact with at least one portion of the electrodes of the arrangement of storage cells. In such an arrangement, the current can be guided to the upper side of the arrangement via the enclosing element. Due to the flat design of the partial areas, both the electric current and the heat can be well dissipated. Additionally, the enclosing element stabilizes the arrangement of storage cells and holds them together.

Such an embodiment has proven to be advantageous in that the at least one first, second and third partial area and optionally the at least one fourth partial area together form at least one portion of at least three or four adjacent sides of the surface of a hollow cuboid. Such an embodiment enables the enclosure of the arrangement of storage cells from four sides and increases stability.

Here, an embodiment has been shown to be effective in which the enclosing element or the first, second and third partial area and optionally the fourth partial area of the enclosing element consists of an electrically conductive material, which has an electrical conductivity of over $1\times10^6$ S/m, in some cases over $20\times10^6$ S/m, in some other cases over $35\times10^6$ S/m, and in even further cases over $50\times10^6$ S/m, in each case at a temperature of 300K, or which comprises such a material, and/or that said enclosing element, in some cases first, second and third partial area, and optionally the fourth partial area, consists of a material or comprises said material which has a thermal conductivity of over 50 W/(m K), in some cases over 100 W/(m K), in some other cases over 200 W/(m K), in each case at a temperature of 0° C. High electrical conductivity reduces the heat created by the electrical resistance. High thermal conductivity ensures fast discharge and fast distribution of the heat, in some cases the heat arising on the contact points between the electrodes of the storage cells and the enclosing element.

It has been shown that rather good electrical conductivity and thermal conductivity can be achieved with an embodiment in which in some cases the at least one first partial area, the at least one second partial area and/or the at least one third partial area and optionally the at least one fourth partial area comprises copper or consists of copper, or in which in some cases, the at least one first partial area, the at least one second partial area and/or the at least one third partial area and optionally the at least one fourth partial area comprise copper or consist of copper.

It can be provided that the second partial area and the third partial area, as well as optionally the fourth partial area, extend from the first partial area, and in some cases are connected with said partial area as a single piece, wherein the second partial area and the third partial area and optionally the second partial area and the fourth partial area, and optionally the third partial area and the fourth partial area, are not directly connected to each other.

For the enclosure of a stacked, essentially cuboid arrangement of storage cells, an embodiment is advantageous in which the second and third partial areas and optionally the fourth partial area, extend in some cases vertically to the surface of the first partial area, away from the first partial area essentially in the same direction.

The form of a part of a hollow cuboid that is thus created can at least partially enclose a stacked arrangement of storage cells from several sides.

In an expedient embodiment, the first, second and third partial areas and optionally the fourth partial area, have an essentially rectangular base area. Of some advantage is also an embodiment in which the second partial area has a plurality of first holes which are at a distance, in some cases a regular distance, from each other, designed for the passage of soldering material, wherein in some cases groups, in some other cases pairs or triplets, of the first holes are present at a distance from adjacent groups, in some cases pairs or triplets, of the first holes, and/or in that the third partial area has second holes, in some cases three second holes, arranged and designed for the mechanical and/or electrical connection of the third partial area with pole contacts. Further, it can be provided that opposite the second partial area, no further partial area extends from the first partial area away from the surface of said partial area.

The present disclosure further provides an enclosure module comprising or consisting of a first enclosing element according to the present disclosure, and a second enclosing element according to the present disclosure which is spatially separated from said first enclosing element, and is in some cases identical.

The enclosing element according to the present disclosure is, in some cases, characterized by high electrical conductivity and/or high thermal conductivity. As a result, the need for active cooling is reduced. The heat can be quickly distributed over the entire enclosing element, and local hotspots can be avoided. The enclosing element according to the present disclosure and in some cases the enclosing module according to the present disclosure can also serve to stabilize a stacked arrangement of electrical storage cells and also protect these against mechanical influences.

The present disclosure further provides a storage module comprising a stacked arrangement of a plurality of electrical storage cells, in some cases at least 5, in some other cases at least 10, and in even further cases at least 15 electrical storage cells, with a contacting side and a rear side opposite the contacting side, and an upper side extending between the contacting side and the rear side and a lower side opposite the upper side, extending between the contacting side and the rear side, a plurality of carrier plates with a front-side edge corresponding to the contacting side and an opposite rear-side edge and a circuit board plate, and optionally a rear side plate, wherein the contacting sides of the storage cells are present on the same side of the arrangement, wherein the carrier plates of the plurality of carrier plates are respectively present between adjacent storage cells, wherein the storage cells each have a first and a second contact element on the contacting side, a positive or a negative electrical pole representing the storage cell, in some cases in the form of an electrically conductive metal tongue, and wherein the circuit board plate has first passage openings, in some cases in the form of slits, for the first and second contact elements.

With the storage module according to the present disclosure, an effective battery system for supplying electrical energy comprising a plurality of electrical storage cells can be provided. In said system, said storage cells are compiled in groups in so-called storage modules. These storage modules can be easily and simply replaced, e.g., if a fault occurs, which considerably increases the maintenance-friendliness. The storage module according to the present disclosure is highly robust against mechanical influences, and protects the electrical storage cells, while at the same time leaving the electrical storage cells sufficient room for possible expansion when charging and discharging.

In this embodiment, the circuit board plate, rear side plate and carrier plates each form a frame around individual storage cells, or two or more of the storage cells. It can be provided that one carrier plate can be arranged between all adjacent storage cells respectively. It has been shown that a stable arrangement can be achieved when a carrier plate is provided on at the most every tenth, in some cases at the most every fifth, storage cell.

The carrier plates can be connected to the circuit board plate and the rear side plate, in some cases by use of latch or plug-in elements, adhesion or bolting. The circuit board plate, rear side plate and carrier plates can also be designed as a single piece.

Surprisingly, it has been shown that very good stability is also achieved by the fact that the circuit board plate comprises second passage openings or recesses, arranged in some cases along the essentially central longitudinal section of the circuit board plate, and the carrier plates on the front-side edge are equipped with at least one first protrusion, arranged and designed to engage into the respective corresponding second passage openings or recesses of the circuit board plate, in some cases in a latching manner. The plug-in connection that is made possible as a result has in practice incredibly been shown to be sufficiently stable and robust.

In a further development of this embodiment, it can be provided that the rear-side plate has three passage openings or recesses, arranged in some cases along the essentially central longitudinal section of the rear-side plate, and the carrier plates on the rear-side edge are equipped with at least one first protrusion, arranged and designed to engage into the respective corresponding third passage openings or recesses of the rear-side plate, in some cases in a latching manner.

Additionally, it can be provided that the stacked arrangement of the plurality of electrical storage cells has on its upper side a carrier plate from the plurality of carrier plates and/or on its lower side one carrier plate from the plurality of carrier plates, in some cases equipped in each case with at least one first protrusion on the front-side edge and optionally at least one second protrusion on the rear-side edge.

It has additionally been proven to be advantageous when the at least one first protrusion on the front-side edge of the upper-side carrier plate engages into a second passage opening or recess or in some cases into an edge-side inlet of the circuit board plate, in some cases in a latching manner, and the at least one second protrusion on the rear-side edge of the upper-side carrier plate engages into a third passage opening or recess or in some cases into an edge-side inlet of the circuit board plate, in some cases in a latching manner and/or when the at least one protrusion on the front-side edge of the lower-side carrier plate latches into a second passage opening or recess or in some cases into an edge-side inlet of the circuit board plate, in some further cases in a latching manner, and the at least one second protrusion on the rear-side edge of the lower-side carrier plate engages into a third passage opening or recess or in some cases into an edge-side inlet of the circuit board plate, in some further cases in a latching manner. In this embodiment, the stacked arrangement of the plurality of electrical storage cells is fully framed by a frame made up of the circuit board plate, the rear-side plate and the upper- and lower-side carrier plates.

In one embodiment, it can be provided that the circuit board plate comprises a base plate made of plastic and on the side facing away from the storage cells, a first metal layer and spatially and/or electrically separate from this, a second metal layer, wherein the first metal layer is positioned in the area of the first passage openings for the first contact element, and the second metal layer is positioned in the area of the first passage openings for the second contact element, and wherein the first and the second metal layer have corresponding openings in the area of the overlap with the first passage openings.

In one variant of the present disclosure, the second passage openings are positioned between the first and the second metal layer.

For further stabilization, it can be provided that the stacked arrangement of a plurality of electrical storage cells is sheathed, in sections or essentially fully, with at least one film, in some cases adhesive film.

Here, it is also advantageous that despite the frame provided by the circuit board plate, the rear-side plate and the carrier plate, and despite the sheath with the at least one film, the storage cells can still expand without dangerous pressures or mechanical tensions arising.

For optimized heat management, use can in some cases be made of a storage module according to the present disclosure which comprises the enclosing module according to the present disclosure described above. Here, advantageously, the second partial area of the first enclosing element and the second partial area of the second enclosing element lie in contact with the circuit board plate, and the first partial area of the first enclosing element lies in contact on the first side area of the stacked arrangement of the plurality of electrical storage cells that extends between the contacting side and the rear side. Further, in so doing, the first partial area of the second enclosing element lies in contact on the second side surface of the stacked arrangement of the plurality of electrical storage cells, which extends between the contacting side and the rear side, positioned opposite the first side surface, and the two enclosing elements are expediently provided electrically insulated from each other, in some cases at a distance from each other.

In a further configuration, the first contact elements, in some cases the first metal tongues, are soldered at least in sections with the first metal layer and optionally with the second partial area of the first enclosing element and/or the second contact elements, in some cases the second metal tongues, are soldered at least in sections with the second metal layer and optionally with the second partial area of the second enclosing element.

For the lowest possible electrical resistance, it is further useful when the second partial area of the first enclosing element is soldered to the first metal layer of the circuit board plate and the second partial area of the second enclosing element is soldered to the second metal layer of the circuit board plate.

In this manner, the electrical storage cells are switched in parallel. As a result of the soldering, the first and second contact elements are electrically connected to each other via the respective metal layer and the respective enclosing element. Usually, in arrangements of electrical storage cells, these are connected in series in order to obtain a high voltage. However, it has been shown that due to the high internal resistance of such a series connection, large heat quantities are released in a small space. In order to counteract a risk caused by too high temperatures, use must therefore usually be made of active cooling elements. It has surprisingly been shown that the parallel connection suitable for the present disclosure can also contribute towards considerably reducing heat development. With the present disclosure, it is possible to omit the use of active cooling elements for cooling the storage cells. Additionally, the enclosing elements of the enclosing module according to the present disclosure act as a heat dissipator. They conduct the heat away from the hottest places, usually the flat soldering points between the contact elements, the metal layers and the second partial areas of the enclosing elements, and distribute it.

Further, it can be provided that the first passage openings in the area of the first metal layer are not aligned, or not completely aligned, with the first holes of the second partial area of the first enclosing element, and that the first passage openings in the area of the second metal layer are not aligned, or not completely aligned, with the first holes of the second partial area of the second enclosing element.

Additionally, an embodiment is advantageous in which the third partial area of the first enclosing element and the third partial area of the second enclosing element are arranged at a distance from and essentially parallel to the upper side of the stacked arrangement of the plurality of electrical storage cells.

Equally, it has been shown to be conducive when the fourth partial area of the first enclosing element and the fourth partial area of the second enclosing element are arranged at a distance from and essentially parallel to the lower side of the stacked arrangement of the plurality of electrical storage cells.

For the connection of the storage module, it is also expedient when this storage module contains at least one module cover which is equipped with a plurality of electrical poles, in some cases an even number of electrical poles, in some other cases at least 2 poles, in further cases at least 4 poles, and in even further cases at least 6 poles, which are arranged and designed to create an electrically conductive connection with the storage cells.

In a further development, a first group, in some cases the first half, of the plurality of electrical poles is connected or connectable in an electrically conductive manner with the third partial area of the first enclosing element, in some cases by use of the second holes present there and a second group, in some cases the second half, of the plurality of electrical poles is connected or connectable in a mechanical and electrically conductive manner with the third partial area of the second enclosing element, in some cases by use of the second holes present there.

For the protection of the storage module according to the present disclosure, an embodiment has also proven useful in which this module further comprises a module bowl with bowl side walls and a bowl floor, wherein the module lid, in some cases by use of adhesion, is connected or connectable to the module bowl, in some cases in a fluid-and/or dust-tight manner.

In one embodiment, it can be provided that the module bowl and module lid consist of or comprise at least one plastic material, in some cases polyethylene or polypropylene or an ethylene copolymer or a propylene copolymer, wherein the module lid is formed from, and in some cases consists of, a harder plastic material than the module bowl.

For the control and monitoring of the storage module according to the present disclosure, it can be provided that the module comprises at least one communication interface which is arranged and designed to collect and/or forward information about a charge state, a charge procedure, a discharge procedure, a temperature, a voltage and/or a current strength of at least one storage cell, in some cases of an arrangement of a plurality of storage cells.

In order to improve impact resilience, it can also be provided that between the lower side of the stacked arrangement of the plurality of electrical storage cells and the bowl floor, at least one first impact-dampening layer, or between the lower side of the stacked arrangement of the plurality of electrical storage cells and the fourth partial areas of the first and second enclosing element, at least one second impact-dampening layer and/or between the fourth partial areas of the first and second enclosing element and the bowl floor at least one third impact-dampening layer is provided.

It has been proven to be practical when the storage cells are arranged essentially parallel along the direction of their depth, in some cases when they are in contact with each other, in some cases to form an essentially cuboid cell arrangement.

Accordingly, a storage module according to the present disclosure can further be provided in which the contact elements, in some cases the metal tongues on the circuit board plate, are combed over, in some cases in such a manner that they are arranged at least partially essentially parallel to the surface of the circuit board plate. Such an arrangement makes it easier to connect, in some cases solder, the contact elements to the metal layers. Additionally, in this manner, a flat contact between the contact element and the metal layer is created which has a considerably lower electrical resistance than a point by point contact.

It has also been proven to be expedient when the enclosing elements together with each of their second partial areas at least partially cover the side of the stacked, in some cases cuboid, arrangement of the plurality of electrical storage cells on which the circuit board plate is arranged with the electrical poles of the storage cells, and the enclosing elements, each with their first partial area, at least partially cover the side surface of the stacked arrangement of the plurality of electrical storage cells which is respectively adjacent to this side, wherein the two enclosing elements are electrically insulated from each other, in some cases are at a distance from each other.

According to one embodiment, all first contact elements of the storage cells of the stacked arrangement of the plurality of electrical storage cells are respectively connected in an electrically conductive manner with the second partial area of the first enclosing element, and all second contact elements of the storage cells of the stacked arrangement of the plurality of electrical storage cells are respectively connected in an electrically conductive manner with the second partial area of the second enclosing element, so that the storage cells are provided in a parallel connection.

In a further configuration of the storage module according to the present disclosure, additionally, a first group, in some cases the first half, of the electrical poles of the module cover is connected in an electrically conductive manner with the second partial area of the first enclosing element, and that the second group, in some cases the second half, of the electrical poles of the module cover, is connected in an electrically conductive manner with the second partial area of the second enclosing element.

It can also be provided that the stacked arrangement of electrical storage cells together with the enclosing elements that enclose them is fully or at least partially sheathed with a film, in some cases an adhesive film. The stability of the stacked arrangement is increased.

Rather satisfactory protection against mechanical and environmental loads on the storage module can be achieved when the stacked arrangement of the plurality of electrical storage cells is arranged in the module bowl in such a manner that it is surrounded by a container formed from the module bowl and module lid.

The embodiments of the storage module described above make a key contribution towards the achievement of a robust, low-maintenance and secure power storage device. Usually, attention is paid to using as little material as possible in order to keep production costs low. Surprisingly, it has emerged that additional material costs are worth paying, however. The use of solid heat and electricity conducting enclosing elements, flat solder points and a plurality of solid module poles each ensures good heat transportation and good heat distribution. Due to the parallel connection of the electrical storage cells, the internal resistance of the module is reduced, as a result of which less heat is released. No active cooling of the module or of the electrical storage cells is required. As a result, production costs can be saved. Additionally, active cooling devices, precisely because of their movable components, are error sources which can have a negative impact on the service life of the system or on maintenance costs. The omission of active cooling elements also enables a dust- and humidity-tight seal of the module. The interior of the module is thus protected against external environmental conditions.

Surprisingly, the storage module according to the present disclosure is extremely robust in relation to strong impact and mechanical influences. The risk of the contact elements being torn off from the electrical storage cells, a weak point in many battery systems in which the so-called pouch cells are used, is considerably reduced. Despite this, the storage module offers the electrical storage cells the opportunity of expanding during charging and/or discharging without hazardous pressures or mechanical tensions being developed in the interior of the module. Due to the parallel connection of the electrical storage cells within the module, the module is also able to continue to supply power even when one or more storage cells fail. By contrast, with a series connection, an immediate repair or replacement of the module would be required.

The task of providing a high-performance, long-life, low-maintenance energy storage system which is also resilient against external mechanical influence and external environmental influences is further attained by a load disconnector, which is arranged and designed to interrupt an electrically conductive connection, comprising a communication interface, at least one control unit and at least one relay, arranged and designed to switch to and fro between an open and a closed state, wherein the electrically conductive connection when the relay is open is interrupted, and the electrically conductive connection when the relay is closed is closed, wherein the control unit is arranged and designed to switch the relay into the open and/or closed state, in some cases into the open state, depending on the voltage, current strength, electrical capacity and/or the temperature. Such a load disconnector protects connected modules from overcharging or deep discharging, too high charging or discharging capacities and damage caused by overheating.

It can further be provided that the control unit of the load disconnector is arranged and designed to switch the relay into the open and/or closed state depending on a control signal transmitted by the communication interface. As a result, it is possible to control the load disconnector remotely. An open relay can thus, e.g., be transferred into the closed state from outside, i.e., without direct access being required to the relay. If the communication interface is further, e.g., connected or connectable to the mobile network, remote maintenance can be conducted without requiring a technician directly on site. Remote shutdown is also possible in this manner.

Additionally, the present disclosure attains an arrangement for supplying electrical energy, comprising at least one storage module of the embodiments described above and at least one load disconnector described above.

It can be provided that the load disconnector is arranged in a housing, the dimensions of which essentially correspond to those of the module housing of the storage module formed from the module bowl and module lid. Such a design facilitates a modular structure of the arrangement for supplying electrical energy.

The present disclosure further provides a trough for holding storage modules, comprising a trough body and a trough lid and in the trough body, at least one storage module and/or at least one arrangement for supplying electrical energy.

In one embodiment, it can be provided that the trough body and the trough lid are connected or connectable with each other in a fluid-tight and/or dust-tight manner. Such a connection increases the protection against external environmental influences.

Additionally, it can be provided that the trough lid comprises at least two trough poles, which are arranged and designed to conduct electric power from the interior of the closed trough to the outer side of the closed trough, and which are connected or connectable with the trough lid in a fluid-tight and/or dust-tight manner.

It has proven to be expedient when the trough lid further comprises at least one communication interface which is arranged and designed to enable communication, in some cases a transmission of electrical impulses, between the interior of the closed trough and the outside world, and which is connected or connectable with the trough lid in a fluid-tight and/or dust-tight manner. This communication interface can here also be connected to the communication interface of the load disconnector in order to process and/or forward its communication data.

A further embodiment of the trough according to the present disclosure comprises at least one temperature sensor. This can, e.g., be connected to at least one control unit of the load disconnector. It can also be provided that the individual storage modules have temperature sensors or that temperature sensors are arranged on all storage modules.

Additionally, the trough can comprise at least one, in some cases electronically heatable, fourth impact-dampening layer, in some cases made of an elastic synthetic material, which is arranged on an inner side of the trough body, in some cases on the inner side located opposite the trough lid, and with generic use is arranged below the at least one storage module, in some cases below all storage modules.

As a result, the content of the trough is protected against mechanical impact and shocks. The heating can be used to enable operation even at low outside temperatures. Additionally, it can be guaranteed that the fourth impact-dampening layer does not lose its elastic properties despite low temperatures.

In a further development, the trough comprises at least one adapter construction element, arranged and designed to affix the trough in a hollow space provided for holding batteries, and/or further comprising at least one additional weight. Battery compartments frequently differ from one manufacturer to another in terms of their size. An adapter construction element enables the fitting and fixation of the trough in battery compartments of different sizes. In this manner, a trough can easily be used in different vehicles and vehicle types. In the case of forklift trucks, heavy lead rechargeable batteries frequently also take on the role of a counterweight. The additional weight enables the use of high-capacity lithium ion rechargeable batteries without the function of the forklift truck being impaired.

It can also be provided that the trough comprises at least one, in some cases metallic, hold-down clamp and at least two connectors, wherein the at least one hold-down clamp is arranged between the trough lid and the at least one storage module or the at least one arrangement for supplying electrical energy.

It has proven to be useful when the poles of the storage modules are connected to the connectors in an electrically conductive manner, so that the storage modules are connected in a first connection, which is a series connection, a parallel connection or a mixed connection made of these two connection types. As a result, the modules can be connected according to the required operating voltage and operating capacity.

It can also be conducive when the first connection with the at least one load disconnector is connected in a second connection and the second connection is connected to the trough poles in an electrically conductive manner. The load disconnector can thus protect the modules against damaging voltages and currents that can be caused by the connected consumers or charge connections.

In one advantageous configuration, the trough according to the present disclosure comprises at least one electronic unit, which during generic use of the trough is, in some cases, located above the storage module(s). As a result, access to the electronic unit is facilitated. The at least one electronic unit can in some cases also comprise the first and/or second connection.

Further, the present disclosure also provides transport vehicles such as baggage tow trucks, forklift trucks, golf carts, goods storage transport vehicles or airplane tow trucks, containing at least one storage module according to the present disclosure, at least one arrangement according to the present disclosure for supplying electrical energy, at least one load disconnector according to the present disclosure and/or at least one trough according to the present disclosure.

The storage module according to the present disclosure, the arrangement according to the present disclosure for supplying electrical energy, the load disconnector according to the present disclosure and the trough according to the present disclosure for the supply of transport vehicles, in some cases unsprung transport vehicles such as baggage tow trucks, forklift trucks, golf carts, goods storage transport vehicles or airplane tow trucks, with electrical energy or as a stationary energy source, are further described in the following illustrated embodiments.

Figure 1:
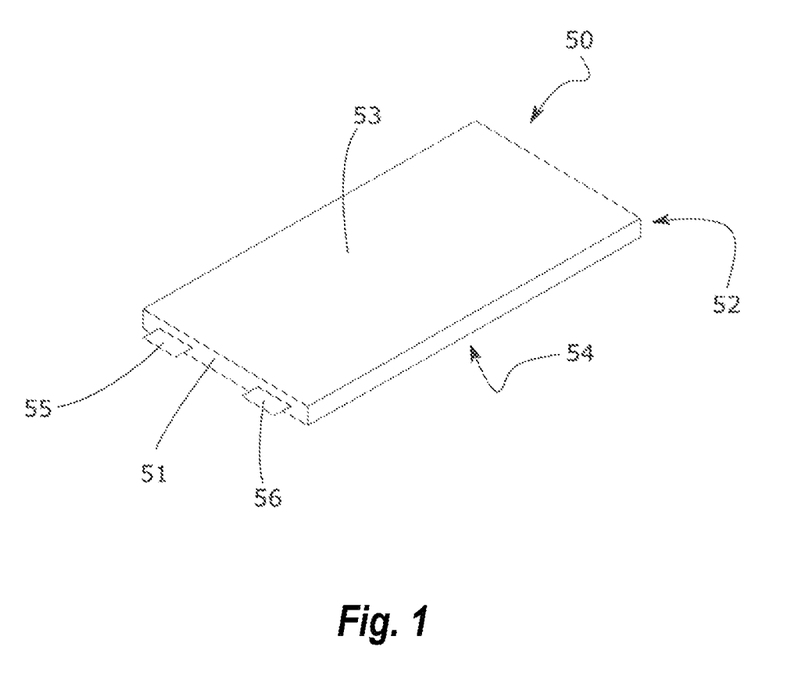
FIG. 1 shows a diagram of an electrical storage cell in the form of a so-called pouch cell.

FIG. 1 schematically shows an electrical storage cell 50 in the pouch cell format. The electrical storage cell has a contacting side 51, also known as the front side, a rear side 52, an upper side 53, a lower side 54 and optionally other sides. On the contacting side, a first contact element 55 and a second contact element 56 are arranged, representing a positive and a negative electrical pole of the storage cell. With the electrical storage cell shown, these are designed as metal tongues.

Figure 2:
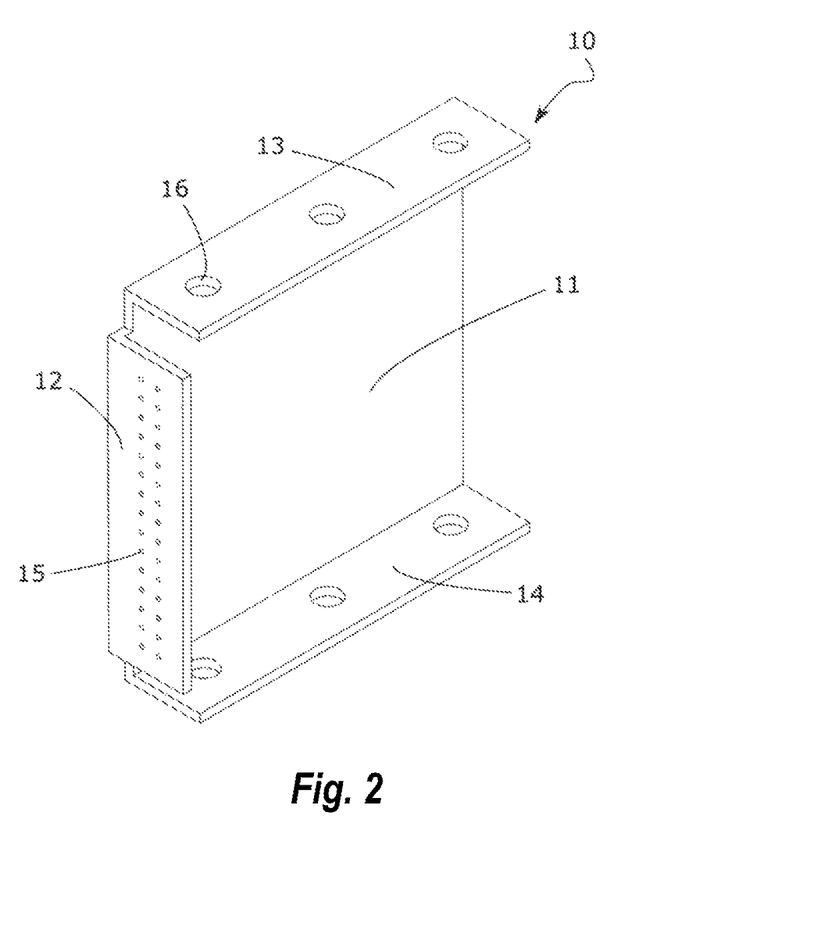
FIG. 2 shows an embodiment of an enclosing element according to the present disclosure.

FIG. 2 shows an embodiment of an enclosing element according to the present disclosure 10. This comprises a first partial area 11, a second partial area 12, a third partial area 13, and a fourth partial area 14. The second 12, third 13, and fourth 14 partial areas extend pointing in the same direction at a right angle away from the first partial area 11. In this form, the four partial areas of the enclosing element 10 represent parts of four adjacent sides of a hollow cuboid. The second partial area 12 has a plurality of first holes 15. The third 13 partial area and in this embodiment also the fourth partial area 14 have second holes 16.

Figure 3:
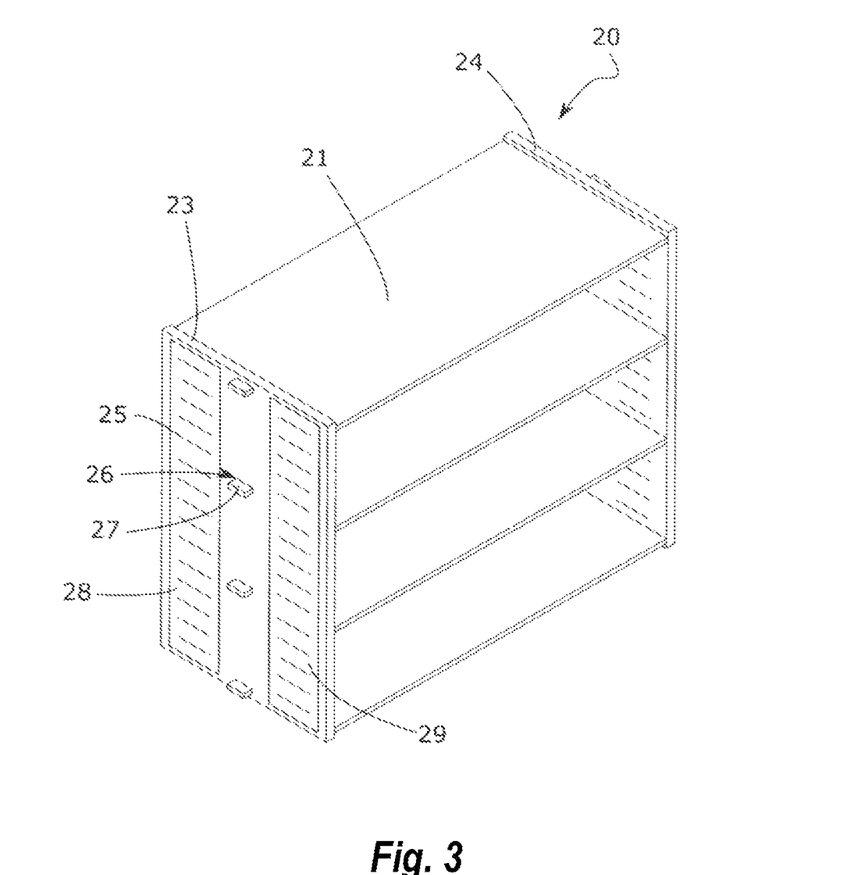
FIG. 3 shows an embodiment of a frame for a stacked arrangement of electrical storage cells.

FIG. 3 shows components of a storage module according to the present disclosure 20. A plurality of carrier plates 21, a circuit board plate 23, and a rear-side plate 24 can be seen. The circuit board plate 23 and in this embodiment also the rear-side plate 24 have first passage openings 25 and second passage openings 26. The carrier plates 21 have protrusions 27 on their front and rear sides. These protrusions 27 engage into the second passage openings 26 of the circuit board plate 23 and the rear-side plate 24. The circuit board plate 23 further has a first metal layer 28 and a second metal layer 29 in the area of the first openings. The circuit board plate 23 and rear-side plate 24 can be identical. In the case of the rear-side plate 24, there is however no need for the first passage openings 25 and the first 28 and second metal layer 29.

Figure 4:
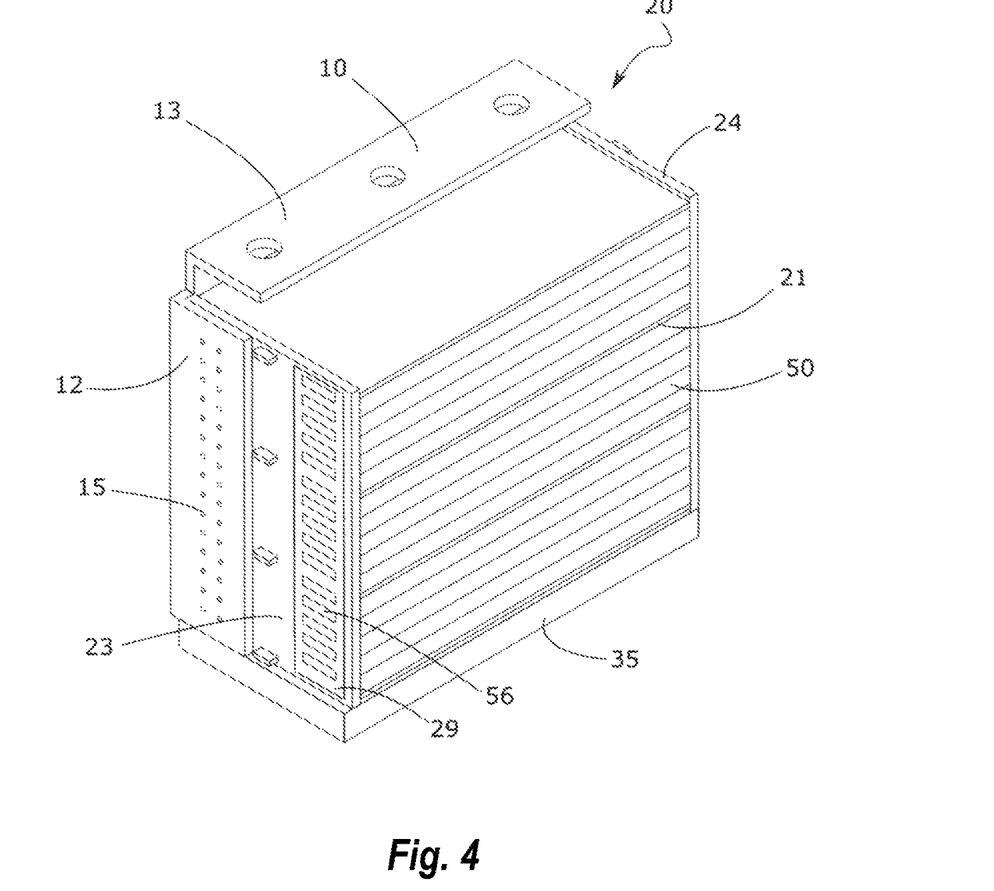
FIG. 4 shows an embodiment of the storage module according to the present disclosure.

FIG. 4 shows an embodiment of a storage module according to the present disclosure 20. For better clarity, only one enclosing element 10 is shown. A stacked arrangement of a plurality of electrical storage cells 50 is framed by the frame structure made by the circuit board plate 23, the rear-side plate 24, and carrier plates 21. The first contact elements 55 (shown in FIG. 1) and second contact elements 56 are guided through the first passage openings 25 and combed over upwards so that they are arranged in parallel at least in sections with the front side of the circuit board plate 23 in the area of the first metal layer 28 (shown in FIG. 3) and second metal layer 29. The enclosing element 10 lies with its first partial area on one side of the stacked arrangement of the plurality of electrical storage cells. The second partial area 12 of the enclosing element 10 lies in contact on the front side of the circuit board plate 23 and the sections of the first combed over contact elements arranged there of the storage cells 50. In this embodiment, the third partial area 13 of the enclosing element 10 is positioned at a distance from the uppermost carrier plate 21. Also, the fourth partial area 14 (shown in FIG. 1) of the enclosing element 10 is positioned at a distance from the lowest carrier plate 21. In the embodiment shown here, a second impact-dampening layer 35 is arranged in the intermediate space between the fourth partial area 14 of the enclosing element 10 and the lowest carrier plate 21.

Figure 5:
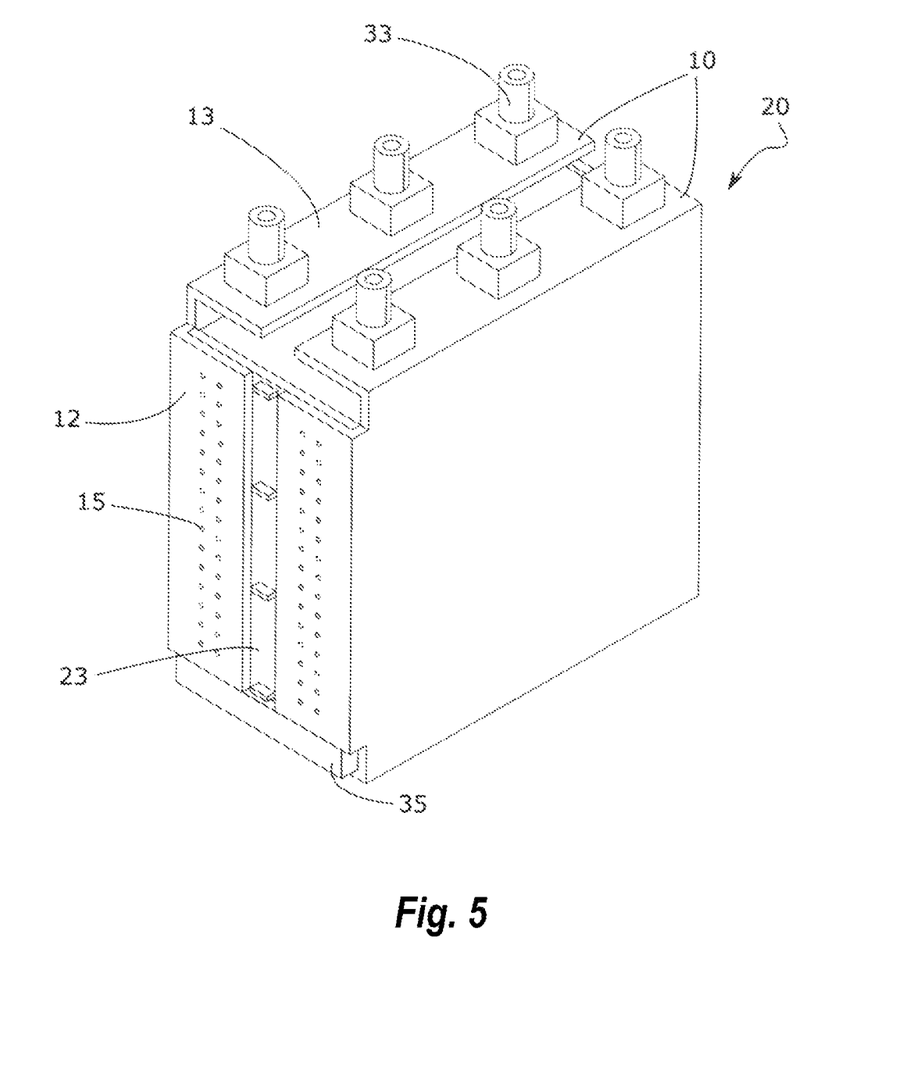
FIG. 5 shows a further embodiment of a storage module according to the present disclosure.

FIG. 5 shows a further embodiment of a storage module 20 according to the present disclosure, with an enclosing module consisting of two enclosing elements 10. On the third partial areas 13 of the enclosing elements 10, three electrical poles 33 respectively are arranged in an electrically conductive manner. The enclosing elements 10 are positioned at a distance from each other.

Figure 6:
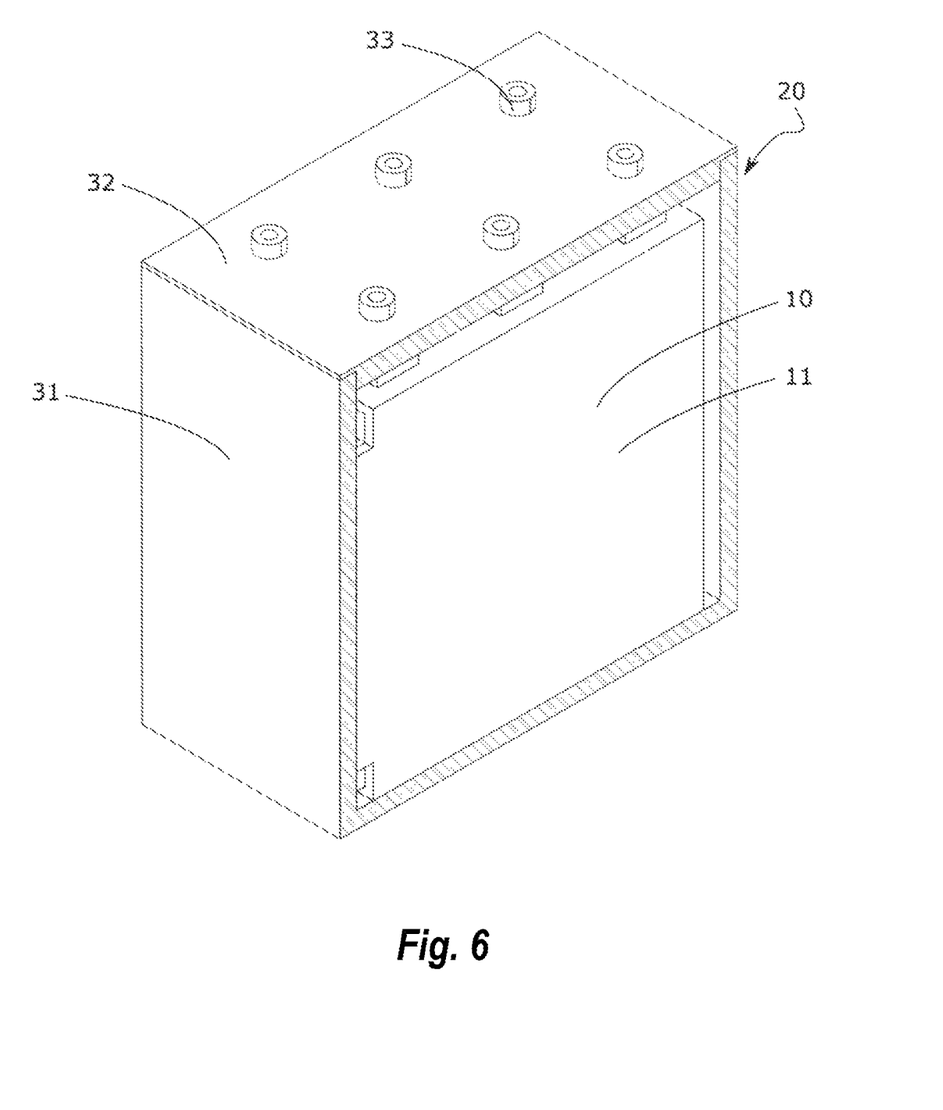
FIG. 6 shows a further embodiment of a storage module according to the present disclosure with housing.

FIG. 6 shows a further embodiment of a storage module 20 according to the present disclosure with housing. For greater clarity, the module lid 32 and module bowl 31 are not shown in full, but are cut open on the hatched areas. The housing, consisting of the module bowl 31 and module lid 32, encloses the enclosing module 10 and the components enclosed by it. The electrical poles 33 are connected to the module lid 32. The electrical poles 33 remain connected to the enclosing elements 10 in an electrically conductive manner.

The features of the present disclosure disclosed in the above description, in the claims and in the drawings can be essential both individually and in any combination required for the realization of the present disclosure in its various embodiments.

The invention claimed is:
1. A storage module, comprising:
  a stacked arrangement of a plurality of electrical storage cells, with a contacting side and a rear side opposite the contacting side, and an upper side extending between the contacting side and the rear side and a lower side opposite the upper side, extending between the contacting side and the rear side;
a plurality of carrier plates with a front-side edge corresponding to the contacting side and an opposite rear-side edge;
a circuit board plate; and
a rear side plate,
wherein the contacting sides of the storage cells are present on the same side of the arrangement,
wherein the carrier plates of the plurality of carrier plates are respectively present between adjacent storage cells,
wherein the storage cells each have a first and a second contact element on the contacting side, a positive or a negative electrical pole representing the storage cell,
wherein the circuit board plate comprises first passage openings for the first and second contact elements,
wherein the stacked arrangement of the plurality of electrical storage cells comprises on its upper side a carrier plate from the plurality of carrier plates and/or on its lower side a carrier plate from the plurality of carrier plates,
wherein:
at least one first protrusion on the front-side edge of the upper-side carrier plate engages into a second passage opening or recess or into an edge-side inlet of the circuit board plate, and
at least one second protrusion on the rear-side edge of the upper-side carrier plate engages into a third passage opening or recess or into an edge-side inlet of the circuit board plate, and/or
wherein:
at least one first protrusion on the front-side edge of the lower-side carrier plate latches into a second passage opening or recess or into an edge-side inlet of the circuit board plate, and
at least one second protrusion on the rear-side edge of the lower-side carrier plate engages into a third passage opening or recess or into an edge-side inlet of the circuit board plate.

2. The storage module according to claim 1, wherein the circuit board plate comprises second passage openings or recesses, and wherein the carrier plates on the front-side edge are each equipped with at least one first protrusion, arranged and designed to engage into respective corresponding second passage openings or recesses of the circuit board plate.

3. The storage module according to claim 1, wherein the rear-side plate comprises third passage openings or recesses, and wherein the carrier plates on the rear-side edge are each equipped with at least one first protrusion, arranged and designed to engage into respective corresponding third passage openings or recesses of the rear-side plate.

4. The storage module according to claim 1, wherein the circuit board plate comprises a base plate made of plastic and on the side facing away from the storage cells, a first metal layer and spatially and/or electrically separate from this base plate, a second metal layer, wherein the first metal layer is positioned in the area of the first passage openings for the first contact element, and the second metal layer is positioned in the area of the first passage openings for the second contact element, and wherein the first and the second metal layer have corresponding openings in the area of the overlap with the first passage openings.

5. The storage module according to claim 1, wherein the stacked arrangement of a plurality of electrical storage cells is sheathed, in sections or fully, with at least one film.

6. The storage module according to claim 1, further comprising:
an enclosing module that includes:
a first enclosing element, arranged and designed for enclosing and electrically contacting a stacked arrangement of a plurality of electrical storage cells, comprising:
at least one first flat partial area, arranged and designed for being brought into contact on a first side surface of the arrangement of electrical storage cells;
at least one second flat partial area, arranged and designed to be brought into contact on a second side surface of the arrangement of electrical storage cells; and
at least one third flat partial area, arranged and designed to be attachable, fittingly or at a distance, from the arrangement of electrical storage cells, when the first partial area and the second partial area are in contact with the first or second side surface of the arrangement of electrical storage cells; and
at least one fourth flat partial area, arranged and designed to be attachable opposite the third partial area fittingly or at a distance from the arrangement of electrical storage cells,
wherein the first, second, third and fourth partial areas of the first enclosing element are connected to each other or are designed as a single piece; and
a second enclosing element, arranged and designed for enclosing and electrically contacting a stacked arrangement of a plurality of electrical storage cells, wherein the second enclosing element is spatially separated from the first enclosing element, the second enclosing element comprising:
at least one first flat partial area, arranged and designed for being brought into contact on a first side surface of the arrangement of electrical storage cells;
at least one second flat partial area, arranged and designed to be brought into contact on a second side surface of the arrangement of electrical storage cells; and
at least one third flat partial area, arranged and designed to be attachable, fittingly or at a distance, from the arrangement of electrical storage cells, when the first partial area and the second partial area are in contact with the first or second side surface of the arrangement of electrical storage cells; and
at least one fourth flat partial area, arranged and designed to be attachable opposite the third partial area fittingly or at a distance from the arrangement of electrical storage cells,
wherein the first, second, third and fourth partial areas of the second enclosing element are connected to each other or are designed as a single piece,
wherein the second partial area of the first enclosing element and the second partial area of the second enclosing element are in contact with the circuit board plate,
wherein the first partial area of the first enclosing element lies in contact on the first side area of the stacked arrangement of the plurality of electrical storage cells that extends between the contacting side and the rear side of the stacked arrangement of the plurality of electrical storage cells,
wherein the first partial area of the second enclosing element lies in contact on the second side surface of the stacked arrangement of the plurality of electrical storage cells, which extends between the contacting side and the rear side, positioned opposite the first side surface, and wherein the two enclosing elements are provided electrically insulated from each other.

7. The storage module according to claim 6, wherein the third partial area of the first enclosing element and the third partial area of the second enclosing element are arranged at a distance from and parallel to the upper side of the stacked arrangement of the plurality of electrical storage cells.

8. The storage module according to claim 6, wherein the fourth partial area of the first enclosing element and the fourth partial area of the second enclosing element are arranged at a distance from and parallel to the lower side of the stacked arrangement of the plurality of electrical storage cells.

9. The storage module according to claim 6, further containing at least one module cover which is equipped with a plurality of electrical poles, said plurality of electrical poles being an even number of electrical poles, which are arranged and designed to create an electrically conductive connection with the storage cells.

10. The storage module according to claim 9, wherein a first group of the plurality of electrical poles is connected or connectable mechanically and electrically with the third partial area of the first enclosing element, and wherein a second group of the plurality of electrical poles is connected or connectable mechanically and electrically with the third partial area of the second enclosing element.

11. The storage module according to claim 9, further comprising:

a module bowl with bowl side walls and a bowl floor, wherein a module lid is connected or connectable to the module bowl in a fluid- and/or dust-tight manner.

12. The storage module according to claim 11, wherein the module bowl and module lid consist of or comprise at least one plastic material, wherein the module lid is formed from a harder plastic material than the module bowl.

13. The storage module according to claim 11, further comprising: between the lower side of the stacked arrangement of the plurality of electrical storage cells and the bowl floor, at least one first impact-dampening layer, or between the lower side of the stacked arrangement of the plurality of electrical storage cells and the fourth partial areas of the first and second enclosing elements, at least one second impact-dampening layer and/or between the fourth partial areas of the first and second enclosing elements and the bowl floor, at least one third impact-dampening layer, is provided.

14. The storage module according to claim 6, wherein all positive electrical poles of the storage cells of the stacked arrangement of the plurality of electrical storage cells are respectively connected in an electrically conductive manner with the second partial area of the first enclosing element, and all negative electrical poles of the storage cells of the stacked arrangement of the plurality of electrical storage cells are respectively connected in an electrically conductive manner with the second partial area of the second enclosing element, so that the storage cells are provided in a parallel connection.

15. The storage module according to claim 9, wherein a first group of the electrical poles of the module cover is connected in an electrically conductive manner with the second partial area of the first enclosing element, and wherein a second group of the electrical poles of the module cover is connected in an electrically conductive manner with the second partial area of the second enclosing element.

16. An arrangement for supplying electrical energy, comprising:

at least one storage module according to claim 1 and at least one load disconnector which is arranged and designed to interrupt an electrically conductive connection, the load disconnector comprising:
a communication interface;
at least one control unit; and
at least one relay, arranged and designed to switch to and fro between an open and a closed state,
wherein the electrically conductive connection is interrupted when the relay is in an open state, and the electrically conductive connection is closed when the relay is in a closed state, and
wherein the control unit is arranged and designed to switch the relay into the open and/or closed state, depending on the voltage, current strength, electrical capacity and/or temperature.

17. A trough for holding storage modules, comprising:
a trough body and a trough lid, and in the trough body, at least one storage module according to claim 1.

18. The trough according to claim 17, wherein the trough lid comprises at least two trough poles, which are arranged and designed to conduct electric power from the interior of a closed trough to the outer side of the closed trough, and which are connected or connectable with the trough lid in a fluid-tight and/or dust-tight manner.

19. The trough according to claim 17, wherein the trough lid further comprises at least one communication interface which is arranged and designed to enable communication between the interior of the closed trough and the outside world, and which is connected or connectable with the trough lid in a fluid-tight and/or dust-tight manner.

20. The trough according to claim 17, further comprising:
at least one hold-down clamp and at least two connectors, wherein the at least one hold-down clamp is arranged between the trough lid and the at least one storage module or at least one arrangement for supplying electrical energy.

21. The trough according to claim 20, wherein the at least one storage module with at least one load disconnector is connected in a second connection and wherein the second connection is connected to the trough poles in an electrically conductive manner.

22. The trough according to claim 17, further comprising:
at least one electronic unit, which during generic use of the trough is located above the storage module or storage modules.

23. A transport vehicle containing at least one storage module according to claim 1.

24. The transport vehicle according to claim 23, wherein said transport vehicle is a baggage tow truck, forklift truck, golf cart, goods storage transport vehicle or airplane tow truck.

25. The use of at least one storage module according to claim 1 for the supply of transport vehicles with electrical energy or as a stationary energy storage source.

* * * * *